US006486639B1

(12) United States Patent
Montret et al.

(10) Patent No.: US 6,486,639 B1
(45) Date of Patent: Nov. 26, 2002

(54) METHOD OF CONTROLLING A STAND-ALONE ELECTRICAL GENERATOR, IN PARTICULAR FOR AIRCRAFT

(75) Inventors: Christophe Montret, Puteaux (FR); Christian Marie Pierre Jacquet-Francillon, Les Essarts le Roi (FR)

(73) Assignee: Dassault Aviation, Paris (FR)

( * ) Notice: Subject to any disclaimer, the term of this patent is extended or adjusted under 35 U.S.C. 154(b) by 0 days.

(21) Appl. No.: 09/717,111

(22) Filed: Nov. 22, 2000

(30) Foreign Application Priority Data

Nov. 24, 1999 (FR) .............................. 99 14780

(51) Int. Cl.[7] .......................... H02H 7/06; H02P 11/00; H02P 9/00; H02P 9/46; H02P 9/10; H02P 9/14
(52) U.S. Cl. ............................. 322/29; 322/22; 322/47; 322/59; 322/61; 322/69
(58) Field of Search ............................. 322/29, 59, 69, 322/61, 22, 47

(56) References Cited

U.S. PATENT DOCUMENTS

| | | | | | |
|---|---|---|---|---|---|
| 4,743,777 A | * | 5/1988 | Shilling et al. | ............... | 290/46 |
| 4,772,802 A | * | 9/1988 | Glennon et al. | ............... | 290/31 |
| 4,794,316 A | * | 12/1988 | Uchino et al. | ................ | 322/47 |
| 4,808,903 A | * | 2/1989 | Matsui et al. | ............... | 318/800 |
| 5,029,288 A | * | 7/1991 | Kubota et al. | ................ | 322/29 |
| 5,055,764 A | * | 10/1991 | Rozman et al. | ............... | 322/10 |
| 5,083,077 A | * | 1/1992 | Wallace et al. | ............... | 322/32 |
| 5,281,905 A | * | 1/1994 | Dhyanchad et al. | .......... | 322/32 |
| 5,495,162 A | * | 2/1996 | Rozman et al. | ............... | 322/10 |
| 5,663,631 A | * | 9/1997 | Kajiura et al. | ................ | 322/29 |
| 5,798,631 A | * | 8/1998 | Spée et al. | ..................... | 322/25 |
| 5,880,550 A | * | 3/1999 | Fukao et al. | ................. | 310/179 |
| 5,994,881 A | * | 11/1999 | Miyazaki et al. | ............. | 322/16 |
| 6,285,089 B1 | * | 9/2001 | Nelson | ........................ | 290/52 |
| 6,333,622 B1 | * | 12/2001 | Fogarty et al. | ............... | 322/90 |
| 6,346,797 B1 | * | 2/2002 | Perreault et al. | .............. | 322/29 |

FOREIGN PATENT DOCUMENTS

| | | | |
|---|---|---|---|
| JP | 63-018998 | * | 1/1988 |
| JP | 01-136598 | * | 5/1989 |
| JP | 02-046199 | * | 2/1990 |
| JP | 03-251099 | * | 11/1991 |

OTHER PUBLICATIONS

Guru & Hiziroglu, Electric Machinery and Transformers, 1995, Oxford University Press, 2nd Ed., pp 160–170.*
Jeong S G et al. "Steady State Analysis of a Stand–Alone Wound Rotor Induction Generator Excited by a PWM Inverter" Conference Record Industry Applications Society Annual Meeting, Oct. 18, 1987.
Yofam Tamg et a; "A Flexible Active and Reactive Power Control Strategy for a Variable Speed Constant Frequency Generating System" IEEE Transactions on Power Electronics, vol. 10, No. 4,—Jul. 1995, pp. 472–478.
Mebarki A et al "A Novel Variable Speed Constant Frequency Generation System with Voltage Regulation" European Conference on Power Electronics and Applications, B. Brussels, EPE Association vol. Conf. 6, 1995, pp. 2465–2471.

* cited by examiner

Primary Examiner—Nestor Ramirez
Assistant Examiner—Pedro J. Cuevas
(74) Attorney, Agent, or Firm—Jacobson Holman PLLC

(57) ABSTRACT

The generator includes an asynchronous machine with a wound rotor driven mechanically and a stator connected to the network. The rotor is excited by a constant DC voltage source via an inverter controlled by a pulse width modulation control circuit. In accordance with the invention, the following are generated: a stator frequency set point, a rotor frequency set point which is a function of the stator frequency set point and the rotation speed of the machine, an rms stator voltage set point, an error signal which is a function of the difference between the rms stator voltage set point and the actual rms stator voltage. A rotor voltage set point is imposed on the control circuit which is a function of the error signal and the rotor frequency set point.

35 Claims, 5 Drawing Sheets

METHOD OF CONTROLLING A STAND-ALONE ELECTRICAL GENERATOR, IN PARTICULAR FOR AIRCRAFT

BACKGROUND OF THE INVENTION

The present invention relates to the production of electrical energy by a stand-alone electrical generator, in particular a stand-alone electrical generator of the type used in aircraft.

The invention relates more particularly to a method of controlling a stand-alone electrical generator of the type used in aircraft.

An electrical generator control method is described in an article by Yifan Tang et al. published in IEEE Transactions On Power Electronics, Vol. 10, No. 4, July 1995.

That prior art control method is applied to an asynchronous machine whose stator is connected to the mains electrical power supply and whose wound rotor is driven mechanically. The method uses a constant DC voltage source for electrical excitation of the rotor winding. The DC voltage source feeds the electrical energy into the rotor via an inverter controlled by a pulse width modulation control circuit.

The direct current source of the prior art control device also includes an AC/DC converter or rectifier which is controlled by a pulse width modulation control circuit and which energizes a capacitor connected to the input of the inverter.

The control circuits of the inverter and the rectifier are controlled by control loops designed to control the operation of the generator so that certain operating criteria are complied with. To be more precise, the control system seeks to achieve stable control by controlling the active and reactive power of the generator. The control loops therefore receive set points in the form of an active power reference value and a reactive power reference value.

However, the above control method is designed to be applied to the generators connected to very high power mains electrical power supply networks in which the frequency and the voltage are imposed by the network itself, for example a public mains electrical power supply network.

However, in some applications of such electrical generators the network supplied is relatively small, as is the case in an aircraft, for example, and the voltage and the frequency are not imposed from the outside, but depend on particular operating conditions of the generator, for example the applied load or the rotation speed at which it is driven. In such applications the rotation speed of the device driving the generator can vary considerably. Thus in an aircraft, for example, the speed depends on the rotation speed of the propulsion engines, and can therefore vary by a factor of greater than 2 (from 500 to 1200 radians per second, for example)

SUMMARY OF THE INVENTION

The invention aims to provide a method of controlling a stand-alone electrical generator producing electrical energy for a relatively small electrical power supply network at a particular nominal voltage and at a frequency which is constant or variable, depending on the application. The benefit of the invention is that it reduces the range of variation of the frequency relative to the range of variation of the rotation speed.

The invention therefore provides a method of controlling a stand-alone electrical generator including an asynchronous rotating machine whose wound rotor is driven mechanically, in particular to power small electrical power supply networks, at a particular voltage and with a particular frequency, such as those used on aircraft, the stator of said machine being connected to the network and its rotor being excited by an inverter controlled by a pulse width modulation control circuit, the inverter itself being excited by a constant DC voltage source, which method is characterized in that it consists of:

- generating a signal representing the stator frequency (or angular frequency) set point,
- generating a signal representing the rotor frequency (or angular frequency) set point as a function of the stator frequency set point and the rotation speed of said machine,
- generating a signal representing the stator voltage rms set point value,
- generating an error signal as a function of the difference between said stator voltage rms set point value and the rms value of the actual stator voltage, and
- imposing on said control circuit a rotor voltage set point which is a function of said error signal and said rotor frequency set point.

Because of the above features, the generator can maintain the voltage applied to the network and its frequency at their respective set point values.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE DRAWINGS

Other features and advantages of the invention will become apparent in the course of the following description, which is given by way of example only and with reference to the accompanying drawings, in which.

DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
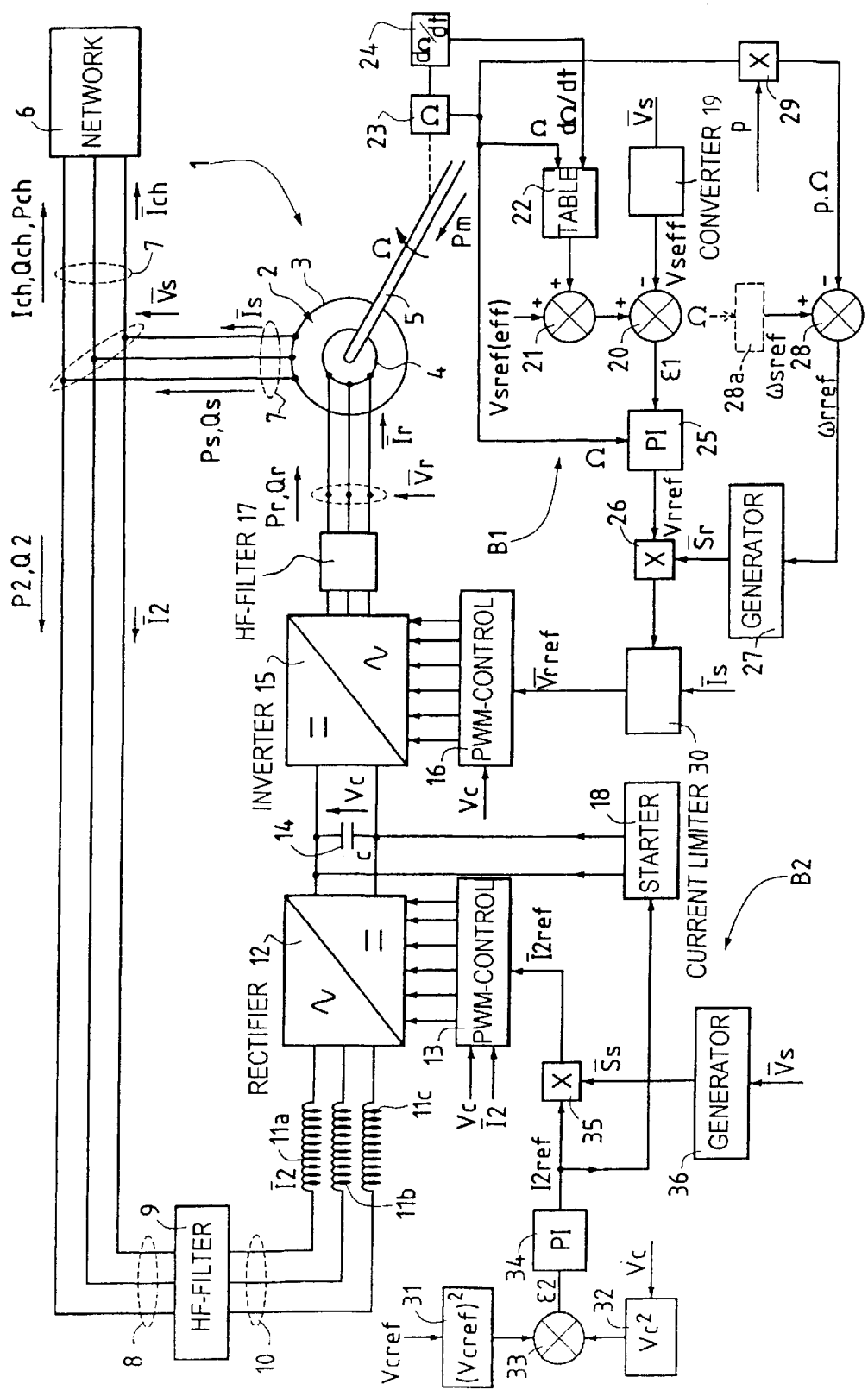
FIG. 1 is a simplified general block diagram of a stand-alone electrical generator including one embodiment of a control device for implementing the method according to the invention.

FIG. 1 shows a stand-alone electrical generator 1. The generator 1 includes an asynchronous rotating machine 2 with a stator 3 and a wound rotor 4. The rotor is driven by a source of mechanical energy (not shown) via a rotary mechanical connection symbolized by the double line 5 in FIG. 1. The generator 1 supplies energy to a network 6 at a voltage $\overline{V}s$ which has an angular frequency ωs which is constant in this example.

Although it is not limited to them, the invention is particularly effective when applied to electrical generators of relatively low power, as used to feed the onboard power supply network of an aircraft, for example. In this case, the mechanical energy source used to drive the asynchronous machine 2 is a propulsion engine of the aircraft, the rotation speed of which varies over a wide range.

In the embodiment shown, the asynchronous machine 2 is a three-phase machine and the network 6 is a three-phase network. However, the invention is not limited to a three-phase asynchronous machine and the control method according to the invention can also be used if an electrical voltage having a different number of phases is to be generated.

The stator 3 is connected directly to the network 6 by conductors 7. It is also connected by conductors 8 to a high-frequency filter 9. The three-phase output 10 of the filter 9 is connected to a set of three inductors 11a, 11b, 11c, of which there is one for each phase, which are in turn connected to the input of a controlled rectifier 12 whose output voltage can be controlled by a pulse width modulation control circuit 13. Controlled rectifiers of the above kind and their control circuit are known to the person skilled in the art and for this reason are not described in detail in this description.

The DC voltage output of the rectifier 12 is connected to a reservoir capacitor 14 which serves as a constant DC voltage source for the downstream circuitry. The capacitor 14 is connected to the input of a controlled inverter 15 whose output voltage can be controlled by a pulse width modulation control circuit 16. These components are also well known to the skilled person.

The three-phase alternating current output of the controlled inverter 15 is applied to a high-frequency filter 17 to which the wound rotor 4 of the asynchronous machine 2 is connected. It can therefore be seen that the rotor 4 is supplied with energy by the machine 2 itself, which takes back some of the electrical energy it produces. As energy is delivered only when the generator is operating, the control method according to the invention also uses a starter 18 which is shown as a block in FIG. 1 and in more detail in FIG. 3, which is described later.

In a variant of the invention the components 8 to 14 could be replaced with any other constant DC voltage source exciting the inverter 15.

There follows a list of the symbols designating the parameters and other magnitudes referred to in the remainder of the description and in the accompanying drawings.

| | |
|---|---|
| Ps | Stator active power |
| Qs | Stator reactive power |
| Pr | Rotor active power |
| Qr | Rotor reactive power |
| Pch | Network active power |
| Qch | Network reactive power |
| P2 | Active power injected into rotor circuit by stator |
| Q2 | Reactive power injected into rotor circuit by stator |
| $\overline{I}s$ | Stator current |
| $\overline{I}r$ | Rotor current |

-continued

| | |
|---|---|
| $\overline{I}2$ | Current taken from stator current for rotor |
| $\overline{I}ch$ | Network current |
| $\overline{V}s$ | Stator voltage |
| $\overline{V}r$ | Rotor voltage |
| $\overline{V}c$ | Constant DC voltage at inverter input |
| Pm | Mechanical power applied to rotor |
| ωsref | Stator angular frequency set point |
| ωrref | Rotor angular frequency set point |
| Vrref | Rotor voltage amplitude set point |
| Ω | Rotor drive shaft rotation speed |
| p | Number of asynchronous machine pole pairs |
| Vsref (rms) | Stator rms voltage set point |
| Vsrms | Stator rms voltage |
| $\overline{V}rref$ | Rotor voltage set point |
| $\overline{S}r$ | Standardized amplitude sinusoidal rotor voltage |
| $\overline{S}s$ | Standardized amplitude sinusoidal stator voltage |
| Vcref | Constant voltage source DC voltage set point |
| $\overline{I}2ref$ | Rotor current set point |
| I2ref | Rotor current amplitude set point |
| $\overline{V}au$ | Auxiliary starter generator voltage |
| $\overline{I}au$ | Auxiliary starter generator current |
| $\overline{I}auref$ | Auxiliary starter generator current set point |
| $\overline{S}au$ | Auxiliary starter generator standardized sinusoidal voltage amplitude |

N.B. The parameters marked thus: ⁻ are three-phase parameters.

A first control loop B1 for generating the voltage set point $\overline{V}rref$ used to control the duty factor of the pulses controlling the operation of the inverter 15 will now be described.

The voltage $\overline{V}s$ is applied to a converter 19 adapted to generate a continuously variable signal representing the rms value Vsrms of that voltage. The output of the converter 19 is connected to one input of an adder 20 whose other input is connected to the output of another adder 21. The adder 21 receives on a first input a stator voltage set point Vsref (rms) and on another input a correction value established, when the speed varies, as a function of the rotation speed Ω and the time derivative of that speed, in other words dΩ/dt. The correction value is chosen from a table 22 in which is stored a set of correction values established empirically or by calculation. To this end, the table 22 is connected to a sensor 23 coupled to the drive shaft 5 to measure its rotation speed. The sensor 23 is also connected to a differentiator 24 calculating the derivative dΩ/dt, which value is applied to the table 22.

An error signal ε1 appears at the output of the adder 20 and is the difference between the instantaneous value of the voltage Vsrms and the set point Vsref(rms) to which the correction value from the table 22 is applied if necessary. The error signal ε1 at the output of the adder 20 is fed to a proportional-integral controller 25 whose proportional and integral coefficients are modified according to the value of the speed Ω that the controller receives from the sensor 23.

The output of the controller 25 at which the set point Vrref (which is a continuously variable signal representing the rotor voltage amplitude set point) appears is connected to a first input of a multiplier 26 whose other input is connected to a generator 27 producing a standardized amplitude three-phase sinusoidal voltage $\overline{S}r$. The frequency of the voltage $\overline{S}r$ generated by the generator 27 is determined by the output of an adder 28 whose input signals are respectively a stator angular frequency set point ωsref and a value p.Ω produced by a multiplier 29 fed with the output of the sensor 23 and a value p representing the number of pole pairs of the machine 2. The multiplier 26 therefore multiplies the voltage set point Vrref by the three-phase sinusoidal voltage $\overline{S}r$.

The stator angular frequency set point ωsref can be constant, as in the example described here.

However, in a variant of the invention, it is possible to vary the stator angular frequency set point ωsref as a function of the rotation speed Ω of the asynchronous machine 2.

If the loads on the network 6 can tolerate some frequency variation, a variable stator angular frequency set point reduces the range of variation of slip of the machine 2 (see FIG. 4, which is described in more detail later) and thereby reduces the maximum power taken from the machine 2 to excite the rotor and thereby reduces losses in the components of the rectifier 12 and the inverter 15.

The stator angular frequency set point is varied in the unit 28a shown in dashed line in FIG. 1, which is connected to the adder 28 and receives the speed signal Ω.

The output of the multiplier 26 is connected to a current limiter 30 receiving a value $\bar{I}s$ representing the stator current and supplying the rotor voltage set point $\bar{V}rref$ for controlling the duty factor of the inverter 15. The value $\bar{V}rref$ is therefore applied to the control circuit 16. The current limiter 30 is designed to maintain the rotor current $\bar{I}r$ within acceptable limits if the stator 3 is short-circuited by the network 6.

As already mentioned, the machine 2 can be controlled by only this first control loop B1 provided that a stand-alone constant voltage source is available which can apply a constant DC voltage Vc to the inverter 15.

Nevertheless, in a preferred embodiment of the invention, the constant DC voltage source is the controlled rectifier 12 which is excited from the machine 2 itself. In this case, it is advantageous to provide a second control loop B2 for applying a current set point $\bar{I}2ref$ to the rectifier 12.

The constant DC voltage set point Vcref is applied to a squaring circuit 31 which produces the value $(Vcref)^2$. The instantaneous value of the DC voltage Vc is applied to another squaring circuit 32 which produces a value $VC^2$. Those two values are applied to an adder 33 which generates an error value ∈2 which is applied to a proportional-integral controller 34 with fixed coefficients whose output is connected to a multiplier 35 to which it applies a sampled current amplitude set point I2ref.

A generator 36 generates a standardized amplitude three-phase sinusoidal voltage $\bar{S}s$ at the same frequency as the three-phase stator voltage $\bar{V}s$ applied to the generator 36. The sinusoidal voltage $\bar{S}s$ is multiplied by the set point I2ref which is a continuously variable signal which represents the amplitude of the current $\bar{I}2$ taken from the stator 3. The set point is obtained from the proportional-integral controller 34 to produce an output signal consisting of the three-phase current set point $\bar{I}2ref$ for controlling the control circuit 13 varying the duty factor applied to the rectifier 12.

Figure 2:
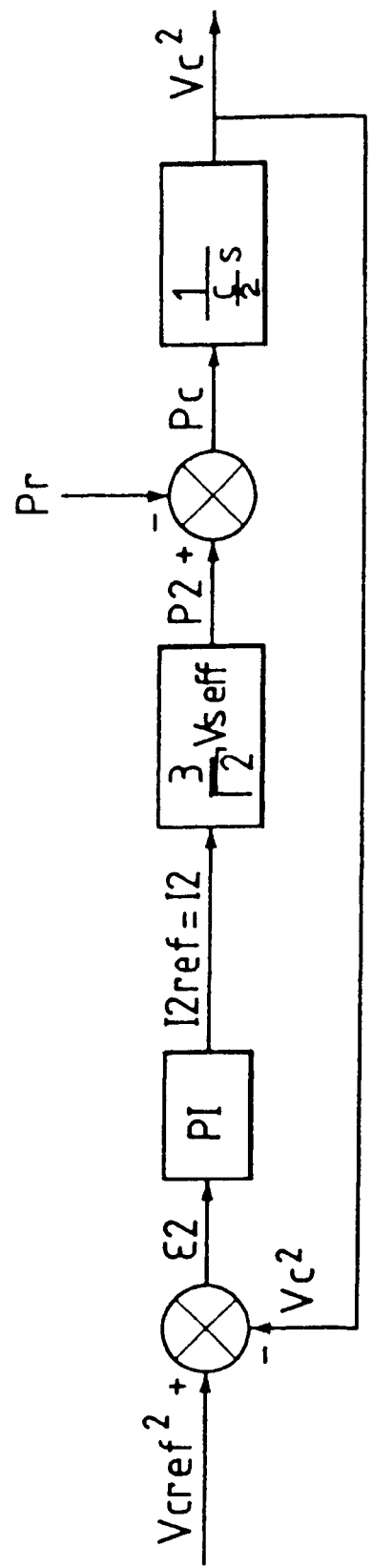
FIG. 2 is a functional block diagram of a control loop used in the control device shown in FIG. 1.

FIG. 2 shows symbolically how the voltage Vc is controlled. In the figure, the rectifier 12 absorbs a perfectly sinusoidal sampled stator current $\bar{I}2$ which is in phase with the voltage $\bar{V}s$. The losses in the rectifier 12 and in the inverter 15 are negligible. If Pc is the instantaneous active power absorbed by the capacitor 14:

$$Pc = \frac{1}{2}C\frac{dVc^2}{dt}$$

in which equation C is the capacitance of the capacitor 14. Also, Pc=P2−Pr. Note further that, in the FIG. 2 diagram, s denotes the Laplace variable.

The execution of the control method in accordance with the invention will now be examined by studying a transient load applied by the network 6 to the machine 2. Only one example of this will be given, namely that in which the rotation speed Ω of the shaft 5 is less than ωs/p (the slip is then greater than zero). The skilled person will understand other operating situations of the control device, deducing them from the above example and with the aid of the detailed description just given of the structure of the control device.

If the power Pch absorbed by the network 6 increases suddenly, the voltage $\bar{V}s$ drops instantaneously. The increase in the current $\bar{I}ch$ that results from the power demand from the network 6 increases the stator current $\bar{I}s$. This draws a rotor current $\bar{I}r$ which increases the rotor power Pr. The current drawn from the capacitor 14 because of the power increase produces a voltage drop Vc.

Under the above conditions, the adder 33 produces an error signal ∈2 which, via the regulator 34, modifies the current amplitude set point $\bar{I}2ref$ and therefore the three-phase set point $\bar{I}2ref$. Accordingly, the current $\bar{I}2$ increases in a manner which reduces the voltage drop Vc, which quickly becomes equal to the set point Vcref.

During this period, because the voltage Vsrms has decreased, the adder 20 produces an error signal ∈1 which, via the regulator 25, increases the voltage set point Vrref and consequently the three-phase set point $\bar{V}rref$ controlling the inverter 15. The increase in the set point $\bar{V}rref$ establishes a new rotor power Pr which changes the stator voltage to a value corresponding to the set point Vsref(rms).

Note that the dynamic range of the loop B2 must be greater than that of the loop B1 and in all cases sufficient to counterbalance the additional energy drawn from the capacitor 14. When the condition Vc=Vcref is again achieved, the energy stored in the capacitor 14 will no longer change and all of the power P2 taken by the rectifier 12 will be transmitted to the rotor 4 via the inverter 15.

In the event of an excessively high load on the machine 2, or even of a short circuit in the network 6, the current $\bar{I}s$ delivered by the machine can instantaneously reach a very high value (several thousand amperes in the case of a short circuit). This can damage the electrical generator and can also lead virtually instantaneously to what might be referred to as "extinction" of the generator, because the voltage Vc falls rapidly to zero and the control loops B1 and B2 are no longer able to respond. To prevent any such "collapse" of the generator 1, it is preferable to impose a limit on the stator current $\bar{I}s$, which can be achieved by means of the unit 30, which, to limit the level of excitation of the machine 2, is adapted to impose a maximum on the set point $\bar{V}rref$ which cannot be exceeded. A similar effect can be obtained by reducing the set point Vsref(rms). Depending on the magnitude and the nature of the overload, an easier way to combat the voltage drop Vc is to switch the power supply from the inverter 15 to the starter 18.

Figure 3:
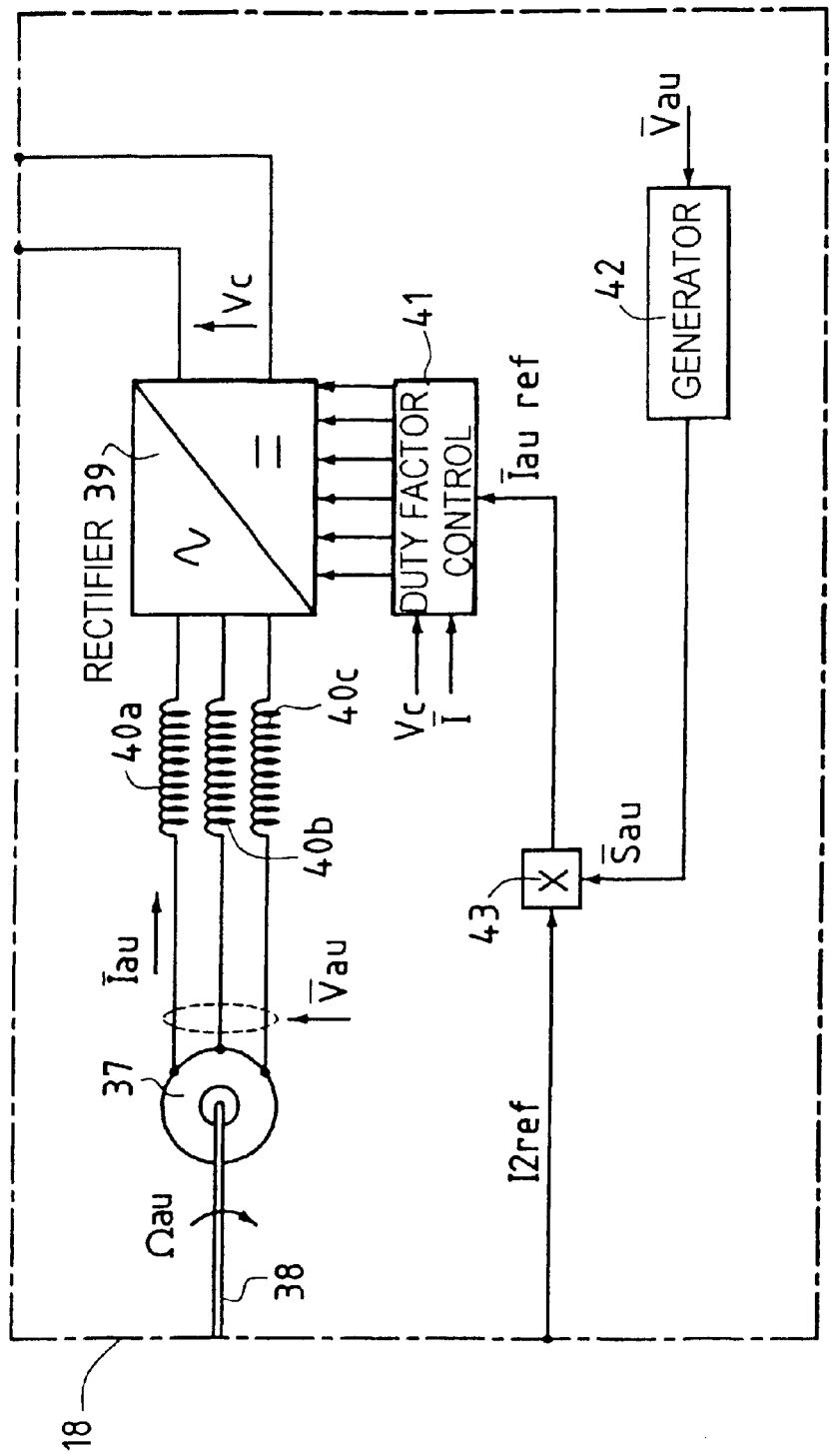
FIG. 3 is a block diagram of a starter for the electrical generator shown in FIG. 1.

FIG. 3 is a block diagram of a starter that can be used to start the alternator 2.

The starter 18 includes a three-phase auxiliary alternator 37 driven mechanically by a mechanical drive device (not shown) via a shaft 38 whose rotation speed is Ωau. Note that on an aircraft the shaft 38 and the shaft 5 are one and the same, so that Ωau=Ω.

The alternator 37 supplies energy to a controlled rectifier 39 via inductors 40a, 40b and 40c. The output of the rectifier 39 is connected to the capacitor 14. It is controlled by a pulse width modulation control circuit 41.

The starter 18 also includes a generator 42 producing a three-phase sinusoidal voltage $\bar{S}au$ and to which is applied a voltage $\bar{V}au$ supplied by the stator of the auxiliary alternator 37. The three-phase voltage $\overline{S}au$ has a standardized amplitude and it is fed to a multiplier 43 in which it is multiplied by the value I2ref from the proportional-integral controller 34 (FIG. 1). The output of the multiplier 43 therefore provides a current set point $\overline{I}auref$ which is applied to the control circuit 41 to control the duty factor of the rectifier 39.

During starting, the machine 2 and the alternator 37 are driven at the same time. If the generator 1 is installed on an aircraft, for example, they are driven by the propulsion engine(s) of the aircraft.

The alternator 37 begins to deliver the voltage $\overline{V}au$ whose angular frequency $\omega au$ is proportional to $\Omega au$. Activating the control circuit 41 then charges the capacitor 14 whose voltage Vc goes from 0 to the set point value Vcref. The control circuit 16 is then activated and begins to produce the voltage $\overline{V}r$, at which time the machine 2 generates the voltage $\overline{V}s$. As soon as the latter voltage has reached its set point value Vsref(rms), the controlled rectifier 12 takes over from the controlled rectifier 39. In other words, the control circuit 41 is inhibited and the control circuit 13 is activated. The machine 2 is then operational.

In the case of the application to an aircraft, the start-up sequence that has just been described can be used to restart the machine 2 in flight, for example after a propulsion engine of the aircraft has been stopped.

As already described, it is also possible to use the starter device 18 in the event of a short circuit at the terminals of the stator of the machine 2. In this case, the sequence of activation and deactivation of the control circuits 13, 16 and 41 must proceed as described above after the short circuit is detected (Is exceeding a predetermined value).

Figure 4:
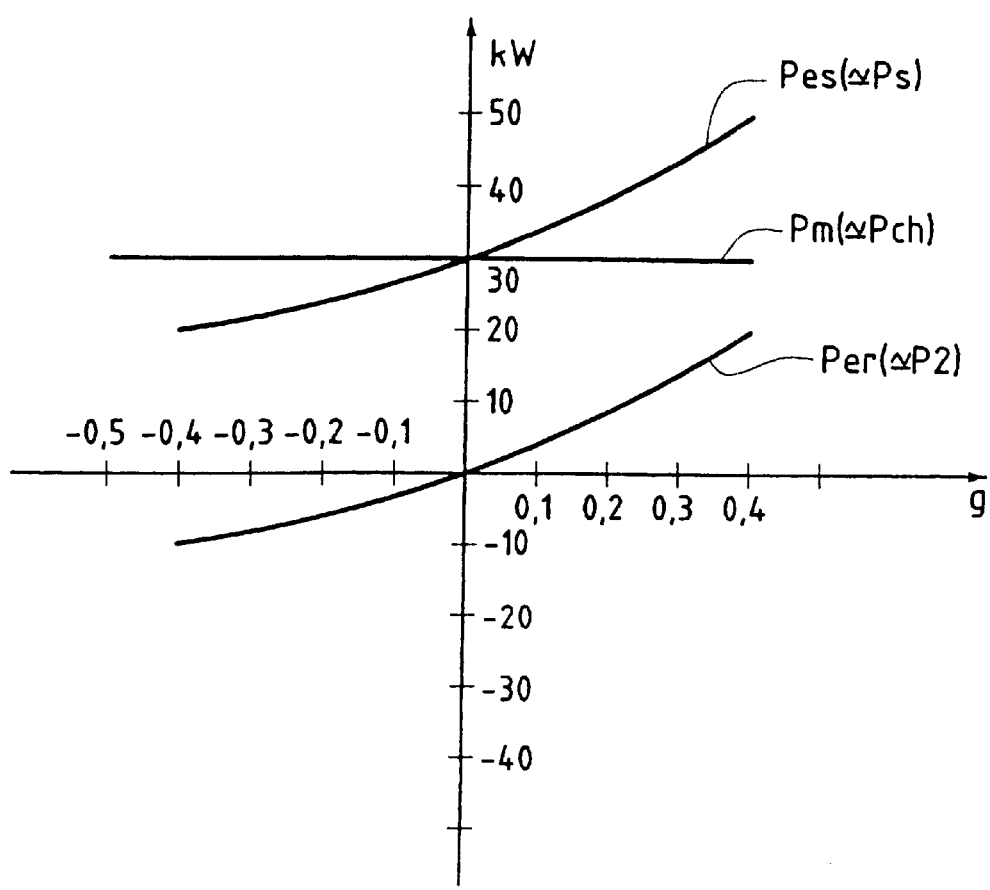
FIGS. 4 and 5 are graphs illustrating the method in accordance with the invention.
Figure 5:
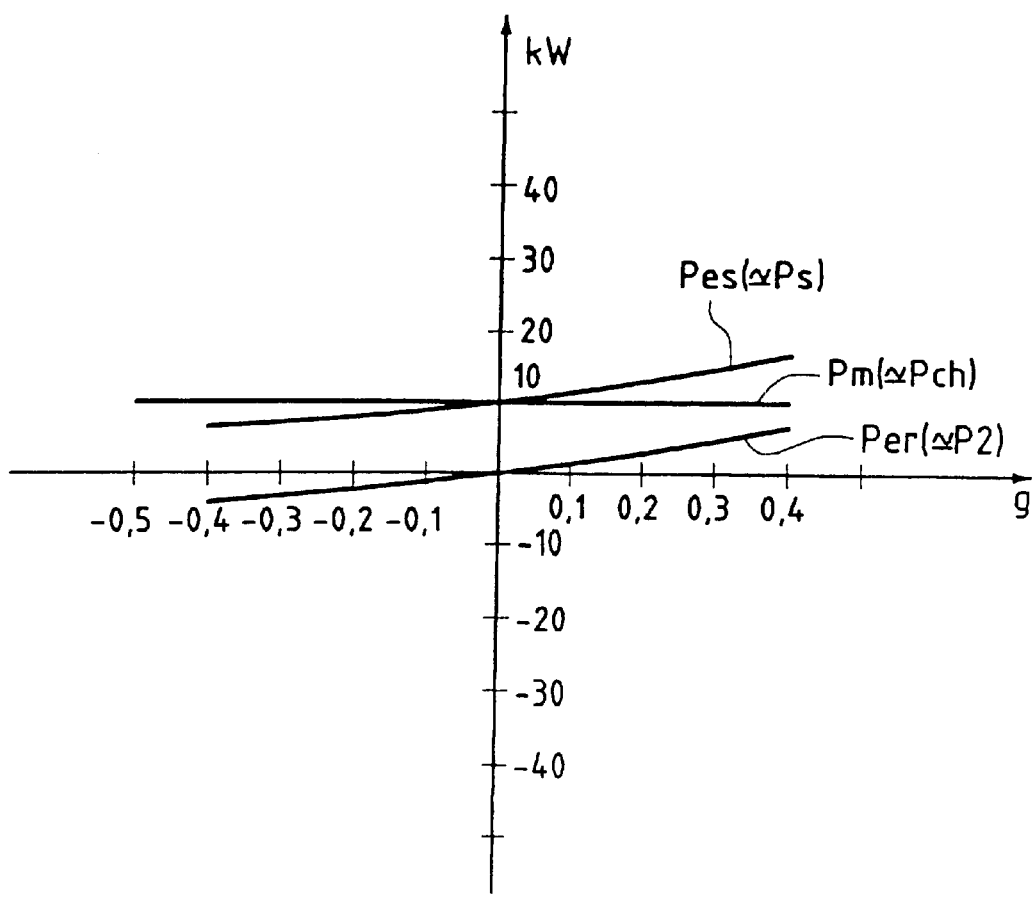

FIGS. 4 and 5 show graphically and by way of non-limiting example the control method of the invention using two examples of operating configurations of a generator equipped with the control device. If a generator of the above kind and its control device are used on board an aircraft, the machine 2 is driven at a speed which varies within a range of speeds that can run from 500 radians per second to 1200 radians per second, for example (the range of variation depends on the propulsion engine used on the aircraft). The operating frequency chosen in this example is constant and equal to 400 Hz and the voltage Vsref(rms) is 115 V. It is assumed that the number p of pairs of poles of the machine 2 is three, so that the slip g can vary from −0.43 to 0.40.

The FIG. 4 and 5 graphs show the changing power in kW as a function of the slip g, respectively for the situation in which the load applied to the machine 2 is 40 kVA and $\cos\phi=0.75$ and for the situation in which the load is 10 kVA and $\cos\phi=1$. The graphs assume that the losses in the machine 2 and those caused in the rectifier 12 and the inverter 15 are negligible. Note that Pes and Per respectively designate the active power transmitted by the windings of the rotor 4 to the air gap and Pes the active power transmitted by the air gap to the stator 3.

According to another embodiment of the method of the invention, the starter 18 could also be rendered reversible and be used over the whole extend of the slip range of the asynchronous rotating machine 2, this operation being carried out outside the mere starting periods. Within the framework of this embodiment, the starter 18 could also be used as high DC voltage source for generating the voltage Vc.

This alternative embodiment could be implemented using the circuit diagrams of FIGS. 1–3 for example by temporarily locking the operation of rectifier 12 by means of its control circuit 13, as long as the generator is maintained in this mode of operation.

However, another possibility, which has already briefly been mentioned before, consists in leaving out components 8–13 of FIG. 1 and in using permanently the starter 18 for the production of voltage Vc.

In both instances, rectifier 39 of FIG. 3 must then be reversible and must be controlled in such a manner:
that alternator 37 operates in an electrical motor mode, when the slip of machine 2 is negative such that mechanical power is applied to shaft 38 and extracted from rotor 4; and
that alternator 37 operates in an electrical generator mode, when the slip of machine 2 is positive such that mechanical power is taken from shaft 38 and applied to rotor 4.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. A method of controlling a stand-alone electrical generator including an asynchronous rotating machine whose wound rotor is driven mechanically at a particular voltage and with a particularly frequency, a stator and said rotor being excited by an inverter controlled by a pulse width modulation control circuit and supplied by a constant DC voltage source, said method comprising the steps of:
generating a signal representing a stator frequency set point,
generating a signal representing a rotor frequency set point, as a function of the stator frequency set point and a rotation speed of said machine,
generating a signal representing a stator voltage rms set point value,
generating an error signal as a function of a difference between said stator voltage rms set point value and a rms value of an actual stator voltage, and
imposing on said control circuit a rotor voltage set point which is a function of said error signal and said rotor frequency set point.

2. The method according to claim 1, and further comprising the step of correcting said stator rms voltage set point value in an event of variations in a speed of the rotor as a function of an instantaneous value of that speed.

3. The method according to claim 2, and further comprising the step of correcting said stator rms voltage set point value, in an event of variations in the speed of said rotor, as a function of a derivative of that speed.

4. The method according to claim 1, and further comprising the step of adjusting the stator frequency set point as a function of a rotation speed of said machine.

5. The method according to claim 1, and further comprising the step of submitting said error signal to proportional-integral control.

6. The method according to claim 5, wherein coefficients of said proportional-integral control are established as a function of a rotation speed of said rotor.

7. The method according to claim 6, and further comprising the step of generating a standardized amplitude sinusoidal voltage having a predetermined rotor frequency and multiplying a result of said proportional-integral control by said standardized amplitude sinusoidal voltage.

8. The method according to claim 7, and further comprising the step of varying a frequency of said standardized amplitude sinusoidal voltage as a function of a stator angular frequency reference value and a slip of said generator.

9. The method according to claim 1, and further comprising the step of limiting said rotor voltage set point to a predetermined maximum value which is a function of a stator current.

10. The method according to claim 1, wherein said constant DC voltage source is obtained by a controlled rectifier excited by a current taken from a current produced by said stator of said machine, and the rectifier is controlled by a second pulse width modulation control circuit, and said method further comprises the step of generating a DC voltage set point, generating a second error signal which is a function of a difference between said DC voltage set point and an actual DC voltage produced by said rectifier, and imposing on said second control circuit a set point for a current taken for the rotor from a stator current which is a function of said second error signal and an actual stator frequency.

11. The method according to claim 10, wherein said second error signal is established as a function of a difference between a square of said DC voltage set point and a square of said actual DC voltage.

12. The method according to claim 11, and further comprising the step of submitting said second error signal to a second stage of proportional-integral control.

13. The method according to claim 12, and further comprising the steps of generating a second standardized amplitude sinusoidal voltage having a frequency equal to an actual stator frequency, and multiplying a result of said second stage of proportional-integral control with said second standardized amplitude sinusoidal voltage.

14. The method according to claim 1, wherein, when said generator is started, said constant DC voltage source is generated by an auxiliary alternator and the auxiliary alternator is switched out when said inverter has begun to function and a rms value of a stator voltage has reached a set point value.

15. The method according to claim 14, and further comprising the steps of rectifying a current supplied by said auxiliary alternator by a second rectifier controlled by a third pulse width modulation control circuit, and imposing on said third control circuit a current set point for said auxiliary alternator.

16. The method according to claim 13, and further comprising the step of generating said current set point for an auxiliary alternator as a function of the result of said second stage of proportional-integral control.

17. The method according to claim 16, and further comprising the steps of generating a third sinusoidal voltage of standardized amplitude at the same frequency as a voltage from said auxiliary alternator, and multiplying the result of said second stage of proportional-integral control by said third sinusoidal voltage to generate said current set point for the auxiliary alternator.

18. The method according to claim 10, and further comprising the step of submitting said second error signal to a second stage of proportional-integral control and said second control stage has a greater dynamic range than the first control stage.

19. A method of controlling a stand-alone electrical generator including an asynchronous rotating machine whose wound rotor is driven mechanically at a particular voltage and with a particular frequency, a stator, and said rotor being excited by an inverter controlled by a first pulse width modulation control circuit and supplied by a constant DC voltage source, said method comprising the steps of:

generating a signal representing a stator frequency set point, generating a signal representing a rotor frequency set point, as a function of the stator frequency set point and a rotation speed of said machine, generating a signal representing a stator voltage rms set point value, generating an error signal as a function of a difference between said stator voltage rms set point value and a rms value of an actual stator voltage, imposing on said control circuit a rotor voltage set point which is a function of said error signal and said rotor frequency set point, generating said constant DC voltage source by an auxiliary alternator and a second pulse width modulation control circuit connected thereto, operating said auxiliary alternator in an electrical motor mode, when a slip of said asynchronous rotating machine is negative, and operating said auxiliary alternator in an electrical generator mode, when a slip of said asynchronous rotating machine is positive.

20. The method according to claim 19, and further comprising the step of correcting said stator rms voltage set point value in an event of variations in a speed of said rotor as a function of an instantaneous value of that speed.

21. The method according to claim 20, and further comprising the step of correcting said stator rms voltage set point value, in an event of variations in the speed of said rotor, as a function of a derivative of that speed.

22. The method according to claim 19, and further comprising the step of adjusting the stator frequency set point as a function of a rotation speed of said machine.

23. The method according to claim 19, and further comprising the step of submitting said error signal to proportional-integral control.

24. The method according to claim 23, wherein coefficients of said proportional-integral control are established as a function of a rotation speed of said rotor.

25. The method according to claim 24, and further comprising the step of generating a standardized amplitude sinusoidal voltage having a predetermined rotor frequency and multiplying a result of said proportional-integral control by said standardized amplitude sinusoidal voltage.

26. The method according to claim 19, and further comprising the step of limiting said rotor voltage set point to a predetermined maximum value which is a function of a stator current.

27. The method according to claim 19, wherein said constant DC voltage source is obtained by a controlled rectifier excited by a current taken from a current produced by a stator of said machine, and the rectifier is controlled by said second pulse width modulation control circuit, and said method further comprises the steps of generating a DC voltage set point, generating a second error signal which is a function of a difference between said DC voltage set point and an actual DC voltage produced by said rectifier, and imposing on said second control circuit a set point for a current taken for the rotor from a stator current which is a function of said second error signal and an actual stator frequency.

28. The method according to claim 27, wherein said second error signal is established as a function of a difference between a square of said DC voltage set point and a square of said actual DC voltage.

29. The method according to claim 28, and further comprising the step of submitting said second error signal to a second stage of proportional-integral control.

30. The method according to claim 29, and further comprising the steps of generating a second standardized amplitude sinusoidal voltage having a frequency equal to an actual stator frequency, and multiplying a result of said second stage of proportional-integral control with said second standardized amplitude sinusoidal voltage.

31. The method according to claim 19, wherein, when said generator is started, said constant DC voltage source is generated by said auxiliary alternator and the auxiliary alternator is switched out when said inverter has begun to function and a rms value of a stator voltage has reached a set point value.

32. The method according to claim 31, and further comprising the steps of rectifying a current supplied by said auxiliary alternator by a second rectifier controlled by a third pulse width modulation control circuit, and imposing on said third control circuit a current set point for said auxiliary alternator.

33. The method according to claim 30, and further comprising the step of generating said current set point for said auxiliary alternator as a function of a result of said second stage of proportional-integral control.

34. The method according to claim 33, and further comprising the steps of generating a third sinusoidal voltage of standardized amplitude at a same frequency as a voltage from said auxiliary alternator, and multiplying a result of said second stage of proportional-integral control by said third sinusoidal voltage to generate said current set point for the auxiliary alternator.

35. The method according to claim 27, and further comprising the step of submitting said second error signal to a second stage of proportional-integral control and said second control stage has a greater dynamic range than the first control stage.

* * * * *